UNITED STATES PATENT OFFICE.

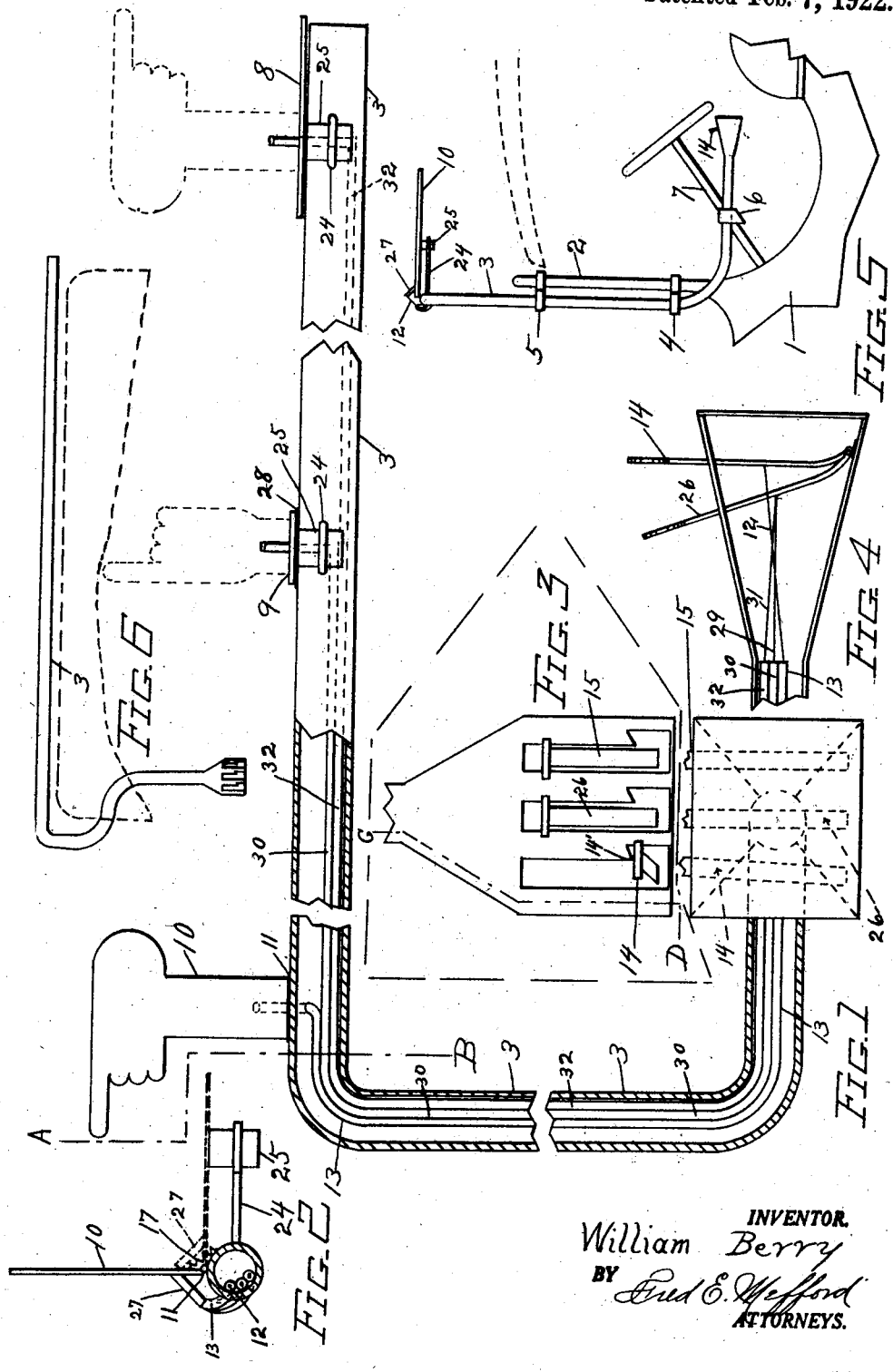
W. BERRY.
AUTOMOBILE SIGNAL DEVICE.
APPLICATION FILED AUG. 26, 1919.
1,405,893.
Patented Feb. 7, 1922.
INVENTOR.
William Berry
BY Fred E. Wefford
ATTORNEYS.

WILLIAM BERRY, OF SAN DIEGO, CALIFORNIA.

AUTOMOBILE SIGNAL DEVICE.

1,405,893.   Specification of Letters Patent.   Patented Feb. 7, 1922.

Application filed August 26, 1919. Serial No. 319,938.

*To all whom it may concern:*

Be it known that I, WILLIAM BERRY, a citizen of the United States, and a resident of San Diego, in the county of San Diego and State of California, have invented a new and useful Automobile Signal Device, of which the following is a specification.

My invention relates to manually operated signals for automobiles to indicate which direction the driver intends to turn.

The objects of my invention are the provision of a signal which can be mounted on the wind shield of the automobile and be operated by the hand of the driver; which can be locked in position to indicate the desired signal and be released when the driver wishes by a simple movement. Other objects will appear as the description progresses.

In the drawings forming a part of this application, Fig. 1 is a rear elevation of the device, partly in section, parts of the levers, the tube and the conduits being broken away; Fig. 2, a section on the line A—B of Fig. 1 showing the horizontal position of the members 10 and 27 by dotted lines; Fig. 3, a fragmentary plan view showing the flared end of the tube 3; Fig. 4, a section on the line C—D of Fig. 3; Fig. 5, a fragmentary elevation of an automobile showing the device mounted on the wind shield, drawn to a reduced scale; and Fig. 6, a plan view of the tube 3, drawn to a reduced scale and showing the relative position of the automobile top by dotted lines.

Similar reference characters refer to like parts throughout the several views.

The reference numeral 1 denotes the automobile; 2, the wind shield; 3, the tube upon which the signals are mounted and in which the conduits are disposed; 4 and 5, the clamps by which the tube 3 is mounted on the wind shield 2; 6, the clamp by which the tube 3 is mounted on the steering wheel column 7; 8, the right hand signal; 9, the middle signal and 10, the left hand signal; the left hand signal 10 is mounted on the tube 3 by the hinge 11 and operated by the cable 12 running through the conduit 13 and connected with the lever 14 in the flared end of the tube 3. The tube 3 is secured near its one end on the steering wheel column and extends forwardly and upwardly along one side of the wind-shield and is secured thereto by the clamps 4 and 5 and extends some distance above the automobile top, then transversely across and above the front of the top as shown in Fig. 5 of the drawings. The signal 9 is mounted on the tube 3 by a hinge 28 and connected to the lever 26 by a cable 29 running through the conduit 30. The signal 8 is mounted on the tube 3 by a hinge and connected to the lever 15 by the cable 31 running through the conduit 32. A supporting rod for each signal is provided comprising the horizontal rod 24 having a felt block 25 secured in a loop of said rod, said rod being mounted in the tube 3. A spring 17 is mounted on the tube 3 and connected with the signal 10 to pull it backward when the lever 14 is released. Each signal is similarly provided with a spring.

To indicate that the driver is going to turn to the left, the lever 14 is pulled backward and made to slip behind the point 14′ which keeps the signal in the vertical position until the lever 14 is released. To indicate that he is going to back up, he pulls the lever 26 in like manner thereby bringing the signal 9 to the vertical position and releases it in the same manner as the signal 10. To indicate that he is going to turn to the right, he pulls the lever 15 and releases it in the same manner as he does the other two signals. The conduits are made to project outside the tube 3 in order that the cables may have a better pull on the signals. The projections 27 on the signals are provided to give a lever by which the signals will be more readily raised, for if the conduits did not extend outside the tube and there were no extensions 27 on the signals, the cables would lie close to the tube and signals and it would therefore be very hard to pull up by the cables.

By the use of my device the driver can mechanically signal in three directions with ease, since the levers are located near the steering wheel.

Having thus described my invention what I claim as new and desire to secure by Letters Patent is:

1. An automobile signal including, a tube with its one end positioned adjacent the steering wheel of the automobile, and extending upwardly and secured to the side of the wind-shield to above the automobile top, then transversely across, a series of arms hingedly mounted on the top of the transverse portion of said tube, a series of levers mounted at the steering wheel end of said tube and a series of cables in said tubes, each cable being connected with an operating member and an arm so that the movement of the operating member moves the arm into vertical or horizontal positions whereby the positions of the arms may be seen from either side, front or behind the vehicle.

2. An automobile signal of the class described including, a bent tube with one end positioned adjacent the steering wheel of an automobile, a portion extending vertically and supported by said automobile and a portion extending above and transversely across above the top of said automobile, a series of arms, hingedly mounted on the top of the transverse portion of said tube, a series of conduits within said tube, a cable within each of said conduits, having one end connected with an arm and a series of levers mounted in the end of said tube, adjacent the steering wheel, connected to said cable, each lever being connected to an independent cable whereby a signal arm is operated so that it may be seen from both sides, in front and behind said automobile.

3. In an automobile signal of the class described, the combination of a tube with one end secured adjacent the vehicle wheel and its opposite end supported in a position above and transversely with the automobile top and supported by the automobile, a series of arms hingedly mounted on the top of said tube and means extending through said tube from the end adjacent the vehicle wheel for operating said arms singly as desired, whereby the position of said arms will indicate the direction the vehicle is about to take from in front, behind or either side of the vehicle.

WILLIAM BERRY.